United States Patent [19]
Oota

[11] Patent Number: 5,493,521
[45] Date of Patent: Feb. 20, 1996

[54] VECTOR CALCULATION APPARATUS CAPABLE OF RAPIDLY CARRYING OUT VECTOR CALCULATION OF TWO INPUT VECTORS

[75] Inventor: Shingo Oota, Yamanashi, Japan

[73] Assignee: NEC Corporation, Tokyo, Japan

[21] Appl. No.: 208,081

[22] Filed: Mar. 9, 1994

Related U.S. Application Data

[63] Continuation of Ser. No. 86,470, Jul. 6, 1993, abandoned, which is a continuation of Ser. No. 788,144, Nov. 7, 1991, abandoned.

[30] Foreign Application Priority Data

Nov. 11, 1990 [JP] Japan ..................................... 2-303504

[51] Int. Cl.$^6$ ........................................................ G06F 7/38
[52] U.S. Cl. ............................................................ 364/736
[58] Field of Search ..................................... 364/736, 768, 364/784

[56] References Cited

U.S. PATENT DOCUMENTS

| | | | |
|---|---|---|---|
| 4,337,519 | 6/1982 | Nishimoto | 364/736 |
| 4,757,444 | 7/1988 | Aoyama et al. | 364/736 X |
| 4,852,040 | 7/1989 | Oota | 364/736 X |
| 4,949,292 | 8/1990 | Hoshino et al. | 364/736 |

FOREIGN PATENT DOCUMENTS 1061545  5/1965  United Kingdom.

*Primary Examiner*—Tan V. Mai
*Attorney, Agent, or Firm*—Foley & Lardner

[57] ABSTRACT

In a vector calculation apparatus, a vector adder (21) produces an adder output signal (E) by calculating a three-term sum of a first, a second, and a third adder input signal which are produced in accordance with the adder output signal, a predetermined value ("0"), a first vector (A), and a second vector (B) under control of a control circuit (29). A first selecting circuit (26) selects, as a first selected signal, one of the adder output signal and the first vector. A second selecting circuit (27) selects, as a second selected signal, one of the adder output signal and the second vector. A zeroth selecting circuit (24) selects, as a zeroth selected signal, one of the adder output signal and the predetermined value. The vector adder is supplied with the first selected signal as the first adder input signal, with the second selected signal as the second adder input signal, and with the zeroth selected signal as the third adder input signal.

2 Claims, 7 Drawing Sheets

VECTOR CALCULATION APPARATUS CAPABLE OF RAPIDLY CARRYING OUT VECTOR CALCULATION OF TWO INPUT VECTORS

This application is a continuation of application Ser. No. 08/086,470, filed Jul. 6, 1993 now abandoned. Which is a continuation of application Ser. No. 07/788,144, filed Nov. 7, 1991 now abandoned.

BACKGROUND OF THE INVENTION

This invention relates to a vector calculation apparatus for carrying out vector calculation on a plurality of vectors. It is to be noted throughout the instant specification that each of the vectors is composed of a plurality of vector components or elements. These are in the form of electrical signals for electrical processing, although a specific description will not be made hereinafter.

A recent requirement for an electronic digital computer is to process a vector calculation at a high speed. The vector calculation is, for example, vector addition of calculating a sum of a pair of vectors. During the vector addition, addition of components of the respective vectors must be repeated a great number of times. This is because each of the vectors is usually composed of many components.

Various conventional vector calculation apparatus are used in the electronic digital computer. One conventional vector calculation apparatus includes a two-input vector adder for carrying out addition of two adder input signals. Supplied with the vectors as the adder input signals, the two-input vector adder carries Out the addition to produce an adder output signal representative of the sum of vectors. This vector calculation apparatus requires a relatively long time as will later be described in detail.

A different conventional vector calculation apparatus includes a three-input vector adder and a selecting circuit. The three-input vector adder is for carrying out addition of three adder input signals to produce an adder output signal. The selecting circuit is for selecting, as a selected signal, a selected one of the adder output signal and a predetermined value, such as zero. Supplied with the vectors and the selected signal as the adder input signals, the three-input vector adder carries out the addition to produce the adder output signal. As will later be described in detail, different this other vector calculation apparatus has a disadvantage in that a very long time is necessary to calculate the sum in the case where the vectors are composed of an enormous number of components.

SUMMARY OF THE INVENTION

It is therefore an object of this invention to provide a vector calculation apparatus which can carry out a vector calculation of two vectors at a high speed.

It is another object of this invention to provide a vector calculation apparatus of the type described, which can quickly calculate a total sum of two vectors.

It is still another object of this invention to provide a vector calculation apparatus of the type described, which is convenient for processing vectors composed of an enormous number of components.

According to this invention, there is provided an apparatus for calculating a result of vector calculation in response to a first vector composed of a plurality of first-set components and a second vector composed of a plurality of second-set components. The apparatus includes a vector adder for carrying out addition of a first, a second, and a third adder input signal to produce an adder output signal as the result and zeroth selecting means connected to the vector adder for selecting, as a zeroth selected signal, a selected one of the adder output signal and a predetermined value. The apparatus comprises first selecting, second selecting, supplying, and control means. The first selecting means is connected to the vector adder and is for selecting, as a first selected signal, a selected one of the first-set components and the adder output signal. The second selecting means is connected to the vector adder and is for selecting, as a second selected Signal, a selected one of the second-set components and the adder output signal. The supplying means is connected to the first, the second, and the zeroth selecting means and is for supplying the vector adder with the first selected signal as the first adder input signal, with said second selected signal as the second adder input signal, and with the zeroth selected signal as the third adder input signal. The control means is connected to the vector adder, the first, the second, and the zeroth selecting means, and the supplying means and is for controlling the vector adder, the first the second, and the zeroth selecting means, and the supplying means.

BRIEF DESCRIPTION OF THE DRAWING

FIG. 6(B) is connected to FIG. 6(A), a time chart for use in describing the operation of the vector calculation apparatus illustrated in FIG. 5.

DESCRIPTION OF THE PREFERRED EMBODIMENT

Figure 1:
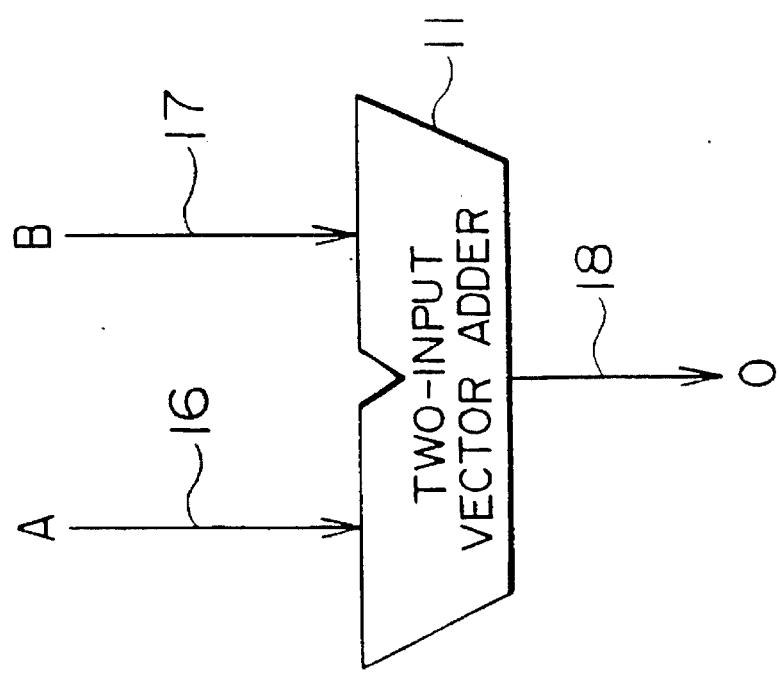
FIG. 1 is a block diagram of a conventional vector calculation apparatus for use in carrying out vector addition.

Referring to FIG. 1, a conventional vector calculation apparatus will first be described for a better understanding of this invention. The conventional vector calculation apparatus is for use in carrying out vector addition of two vectors. The illustrated vector calculation apparatus comprises a two-input vector adder 11 which is connected to first and second input lines 16 and 17. The vectors are supplied as a first and a second adder input signal to the vector adder 11 through the first and the second input lines 16 and 17, respectively, and may be called first and second input vectors A and B (such vectors being denoted herein by ordinal letters rather than either by thick letters or by the ordinal letters with horizontal arrows over them).

It will be assumed that the first input vector A is composed of a sequence of first-set components or elements $(a_1, a_2, \ldots, a_n)$ which may be called first through n-th components of the first input vector A, respectively. Likewise, the second input vector B is composed of a sequence of second-set components $(b_1, b_2, \ldots, b_n)$ which may be referred to as first through n-th components of the second input vector B. It is assumed in this manner in the illustrated example that the first input vector A has the same number of components as the second input vector B.

The vector addition of the first and the second input vectors A and B is for calculating an output vector O composed of a sequence of output components ($o_1, o_2, \ldots, o_n$) which may be called first through n-th output components. Specifically, the vector adder 11 successively sums up the first-set and the second-set components ($a_1, a_2, \ldots, a_n$) and ($b_1, b_2, \ldots, b_n$) to produce the first through the n-th output components ($o_1, o_2, \ldots, o_n$) which appear on an adder output line 18. Each output component $o_i$ is given by:

$$o_i = a_i + b_i,$$

where i is variable between i and n, both inclusive.

Figure 2:
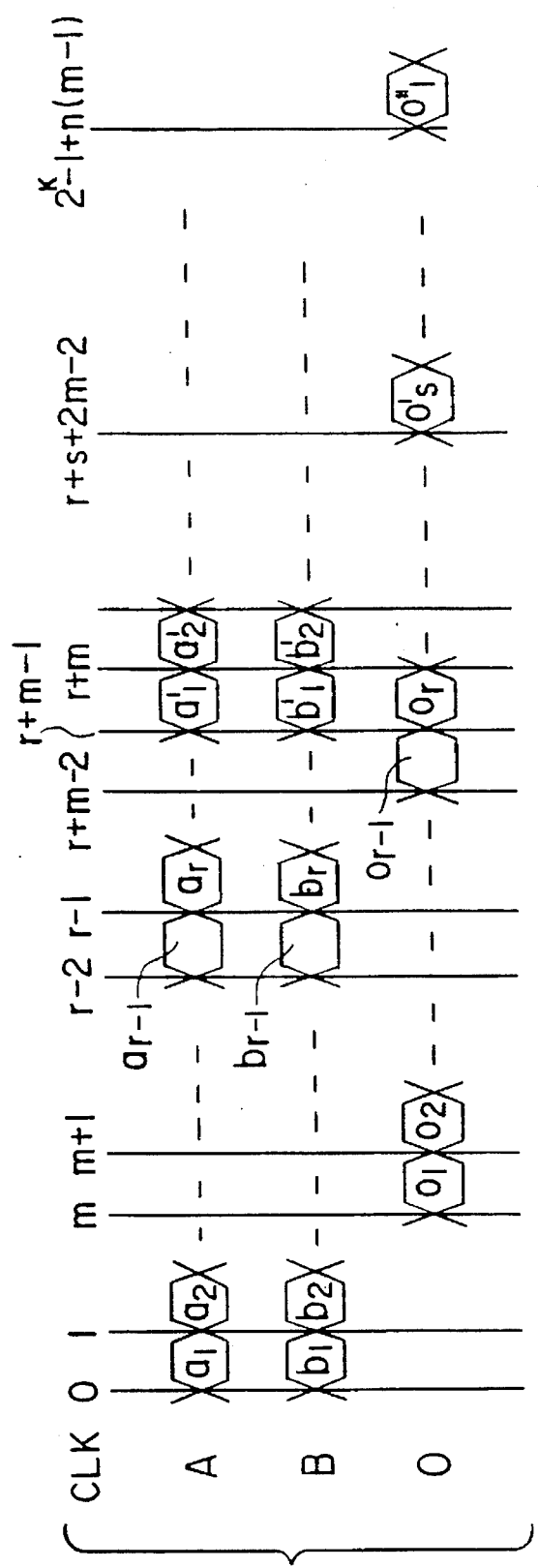
FIG. 2 is a time chart for use in describing operation of the vector calculation apparatus illustrated in FIG. 1.

Referring to FIG. 2 in addition to FIG. 1, the description will be made as regards calculation of a total sum of $2^k$ components of the first and the second input vectors A and B, where k represents a predetermined number, $2^k$ being not greater than n. A calculation time will be assumed to be equal to mT, where m is an integer and T is representative of a clock cycle which determined by a sequence of clock pulses. The clock cycle is illustrated along a first or top row labelled CLK. The first-set components are depicted along a second row labelled A. The second-set components are illustrated along a third row labelled B. The adder output signal is shown along a fourth or bottom row labelled O.

The $2^k$ component are divided at first into the first-set and the second-set components. The first-set components are $2^{k-1}$ in number. The second-set components are also $2^{k-1}$ in number. First ones $a_1$ of the components of the first and the second input vectors A and B are supplied through the first and the second input lines 16 and 17 to the vector adder 11 in timed relation to a zeroth one of the clock pulses. Subsequently, second through $2^{k-1}$-th components of the first and the second input vectors A and B are successively supplied to the vector adder 11 in synchronism with first through ($2^{k-1}-1$)-th clock pulses, respectively. In FIG. 2, a simplified symbol r is substituted for $2^{k-1}$ merely for simplification of illustration. A simplified symbol s is substituted for $2^{k-2}$ merely for simplification of illustration. The simplified symbols will be used also in the following.

In the manner depicted in FIG. 2, first through r-th components $o_1$ to $o_r$ appear as local sum components on the output line 18 in synchronism with m-th through (r+m−1)-th clock pulses, respectively. A calculation time of ($2^{k-1}$+m−1)T is required to calculate the $2^{k-1}$ local sum components. Therefore, a total calculation time TCT is given:

$$TCT = \sum_{i=0}^{k-1} (2^i + m - 1)T =$$

$$\left\{ \sum_{i=0}^{k-1} 2^i + \sum_{i=0}^{k-1} (m-1) \right\} T = \{2^k - 1 + k(m-1)\}T.$$

When it is assumed that m is equal to 9 and that k is equal to 8, the total calculation time is as follows:

$$TCT = \{2^k - 1 + k(m-1)\}T =$$

$$\{2^8 - 1 + 8(9-1)\}T = (2^8 + 63)T.$$

Figure 3:
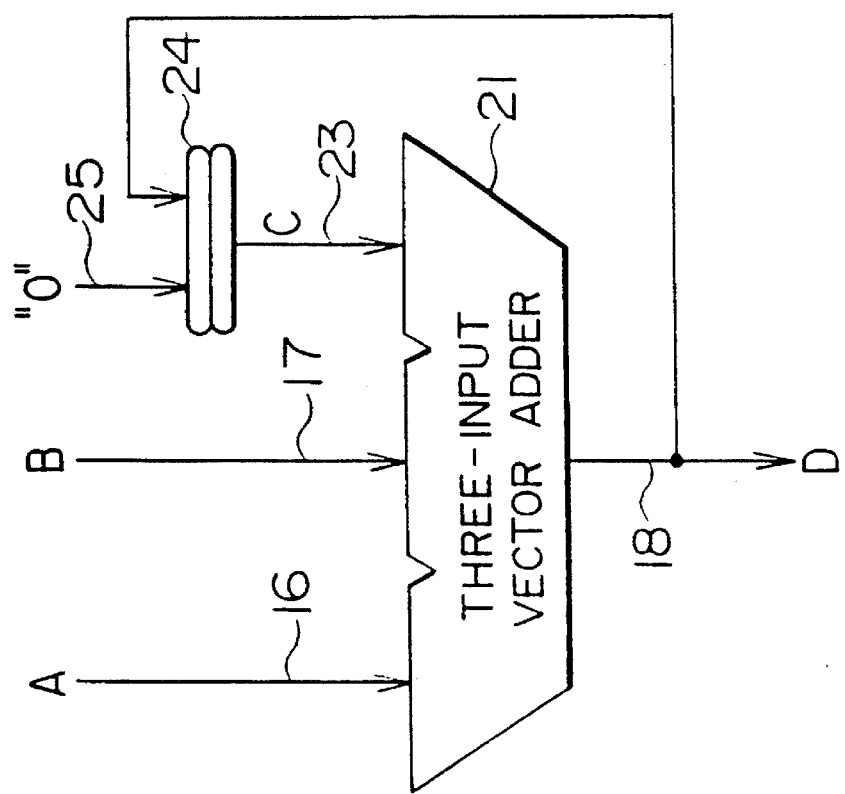
FIG. 3 is a block diagram of another conventional vector calculation apparatus.

Referring to FIG. 3, the description will be directed to a different conventional vector calculation apparatus. The different conventional vector calculation apparatus comprises similar parts designated by like reference numerals.

In FIG. 3, the vector calculation apparatus comprises a three-input vector adder 21 which is for carrying out vector addition of three vectors. The vector adder 21 is connected to a third input line 23 in addition to the first and the second input lines 16 and 17. Two of the vectors are supplied as the first and the second input vectors A and B to the vector adder 21 through the first and the second input lines 16 and 17. The remaining one of the three vectors is supplied as a third adder input signal to the vector adder 21 through the third input line 23 and may be called a third vector C (such a vector being also denoted herein by ordinal letters rather than by thick letters). As will later be described in detail, the third vector C is composed of a sequence of third-set components and is assumed to have the same number of components as each of the first and the second vectors A and B.

Supplied with the first through the third vectors A, B, and C, the vector adder 21 carries out the vector addition to produce an output vector D as an adder output signal representative of a result of the vector addition. The output vector D is composed of a sequence of output components ($d_1, d_2, \ldots, d_n$) which may be called first through n-th output components. Specifically, the vector adder 21 successively sums up the first-set, the second-set, and the third-set components to produce the first through the n-th output components ($d_1, d_2, \ldots, d_n$) which appear on the output line 18. Each output component $d_i$ is given by:

$$i\ d_i = a_i + b_i + c_i.$$

The vector calculation apparatus further comprises a selecting circuit 24 which is connected to the output and the third input lines 18 and 23 and to an additional input line 25. The selecting circuit 24 is for selecting, as a selected signal, one of the adder output signal and a predetermined value which may be "0" and is supplied through the additional input line 25. The selected signal is supplied as the third vector c to the vector adder 21 through the third input line 23. Therefore, the third vector C is composed of one of the predetermined value and the first through the n-th output components ($d_1, d_2, \ldots, d_n$).

Figure 4:
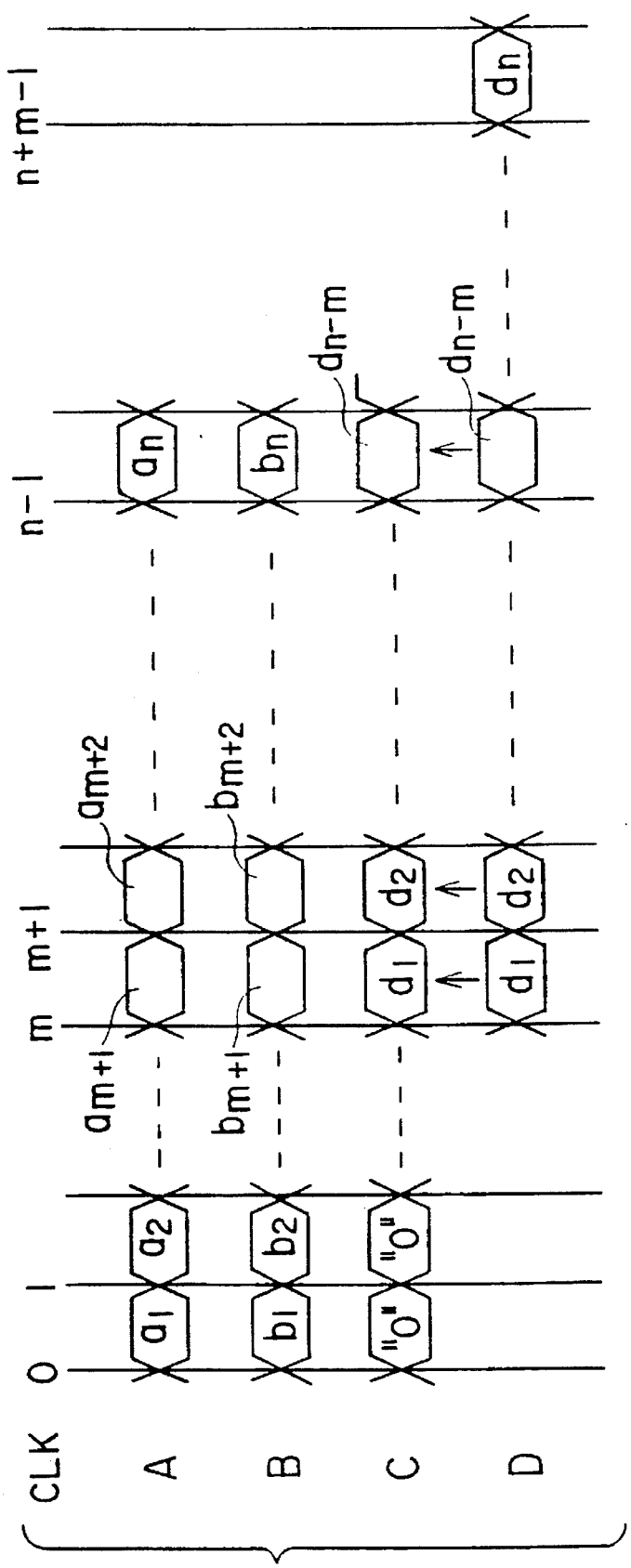
FIG. 4 is a time chart for use in describing the operation of the vector calculation apparatus illustrated in FIG. 3.

Referring to FIG. 4 in addition to FIG. 3, the description will be made as regards operation of the vector calculation apparatus. The first-set components are depicted along a first or top row labelled A. The second-set components are illustrated along a second row labelled B. The third-set components are illustrated along a third row labelled C. The adder output signal is shown along a fourth row labelled D.

The operation of the vector calculation apparatus is controlled in accordance with each of successive timing cycles which comprises zeroth, first through (m−1)-th, m-th, (m+1)-th through (n−1)-th, and n-th through (n+m−1)-th cycle times 0, 1, to (m−1), m, (m+1) to (n−1) n to (n+m−1).

During the zeroth through the (m−1)-th cycle times 0 to (m−1), the selecting circuit 24 selects in each of the timing cycles the predetermined value "0" as the selected signal. Therefore, the vector adder 21 carries out the vector addition as follows:

$$d_i = a_i + b_i + 0.$$

At the m-th cycle time m, the selecting circuit 24 selects the first output component $d_1$ as the selected signal in the manner indicated by an upwardly directed arrow drawn from a fourth of bottom row labelled D to the third row C. The first output component $d_1$ is supplied to the vector adder 21. In this manner, the second through (n−m)-th output components $d_2$ through $d_{n-m}$ are supplied to the vector adder 21 during the (m+1)-th through (n−1)-th cycle times (m+1) to (n−1). Therefore, the vector adder 21 carries out the vector addition as follows:

$$d_i = a_i + b_i + d_{i-m}$$

As a result, the vector adder 21 produces first local addition results m times, when i varies from $(2^{k-1} - m+1)$ to $2^{k-1}$ through $(2^{k-1} - m+2), \ldots$, and so forth.

The first local addition results are divided into a first and a second group. The operation of the vector calculation apparatus is carried out again with the first and the second groups supplied to the vector adder 21 as the first and the second input vectors A and B. As a result, the vector adder 21 produces second local addition results for use as the first and the second input vectors A and B. In this manner, the second local addition results are repeatedly obtained to result in the total sum of $2^k$ components.

The calculation time of $(2^{k-1}+m-1)T$ is required in order to obtain the first local addition results. The calculation time of $\{2^p-1+p(m-1)\}T$ is required to obtain the second local add times, where p represents a predetermined number, and m being as follows:

$$2^p > m > 2^{p-1}.$$

Accordingly, the total calculation time TCT is given $$TCT = [(2^{k-1} + m - 1) + \{2^p - 1 + p(m-1)\}]T =$$

$$\{2^{k-1} + 2^p - 1 + (p+1)(m-1)\}T.$$

When it is assumed that m is equal to 9, that k is equal to 8, and that p is equal to 4, the total calculation time TCT is as follows:

$$TCT = \{2^{k-1} + 2^p - 1 + (p+1)(m-1)\}T =$$

$$\{2^{8-1} + 2^4 - 1 + (4+1)(9-1)\}T = (2^{8-1} + 55)T.$$

Namely, the vector calculation apparatus has a disadvantage in that a very long time is necessary to calculate the total calculation time in case where m is relatively great.

Figure 5:
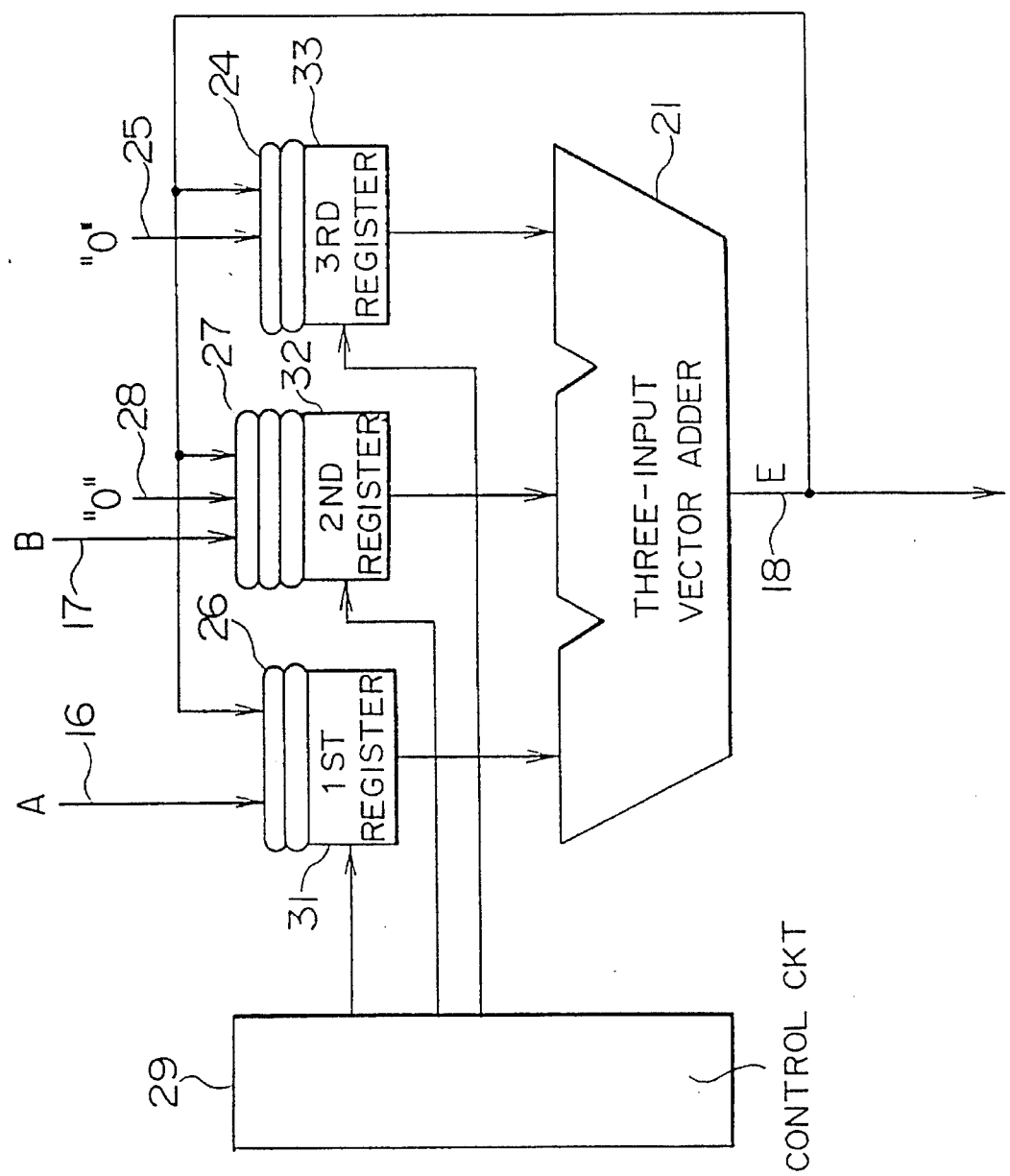
FIG. 5 is a block diagram of a vector calculation apparatus according to an embodiment of this invention.

Referring to FIG. 5, the description will be directed to a vector calculation apparatus according to an embodiment of this invention. The vector calculation apparatus comprises similar parts designated by like reference numerals. Herein, the selecting circuit 24 is referred to as a zeroth selecting arrangement.

In FIG. 5, the vector calculation apparatus comprises first and second selecting circuits 26 and 27. In the manner which will presently be described more in detail, the first selecting circuit 26 is connected to the first input line 16 and the three-input vector adder 21 and is for selecting, as a first selected signal, a selected one of the first-set components and the adder output signal. The second selecting circuit 27 is connected to the second input line 16, the vector adder 21, and a supplementary input line 28 and is for selecting, as a second selected signal, a selected one of the second-Let components, the adder output signal, and the predetermined value that is supplied through the supplementary input line 28.

The vector calculation apparatus further comprises a control circuit 29, a first register 31, a second register 32, and a third register 33. The control circuit 29 is connected to the vector adder 21 and the first through the third registers 31 to 33 and to the zeroth, the first, and the second selecting circuits 24, 26, and 27 through the first through the third registers 31 to 33 and is for controlling the vector adder 21, the first through the third, registers 31 to 33 and the zeroth, the first, and the second selecting circuits 24, 27, and 28 as will later be described in detail.

It will shortly be described that the first register 31 is connected to the vector adder 21 and the first selecting circuit 26 and is for memorizing the first selected signal as a first memorized signal to supply the first memorized signal as the first adder input signal to the vector adder 21 under control of the control circuit 29.. The second register 22 is connected to the vector adder 21 and the second selecting circuit 27 and is for memorizing the second selected signal as a second memorized signal to supply the second memorized signal as the second adder input signal to the vector adder 21 under control of the control circuit 29. The third register 33 is connected to the vector adder 21 and the zeroth selecting circuit 24 and is for memorizing the zeroth selected signal as a zeroth memorized signal to supply the zeroth memorized signal as the third adder input signal to the vector adder 21 under control of the control circuit 29. A combination of the first through the third registers 31 to 33 is referred to as a supplying arrangement.

Figure 6A:
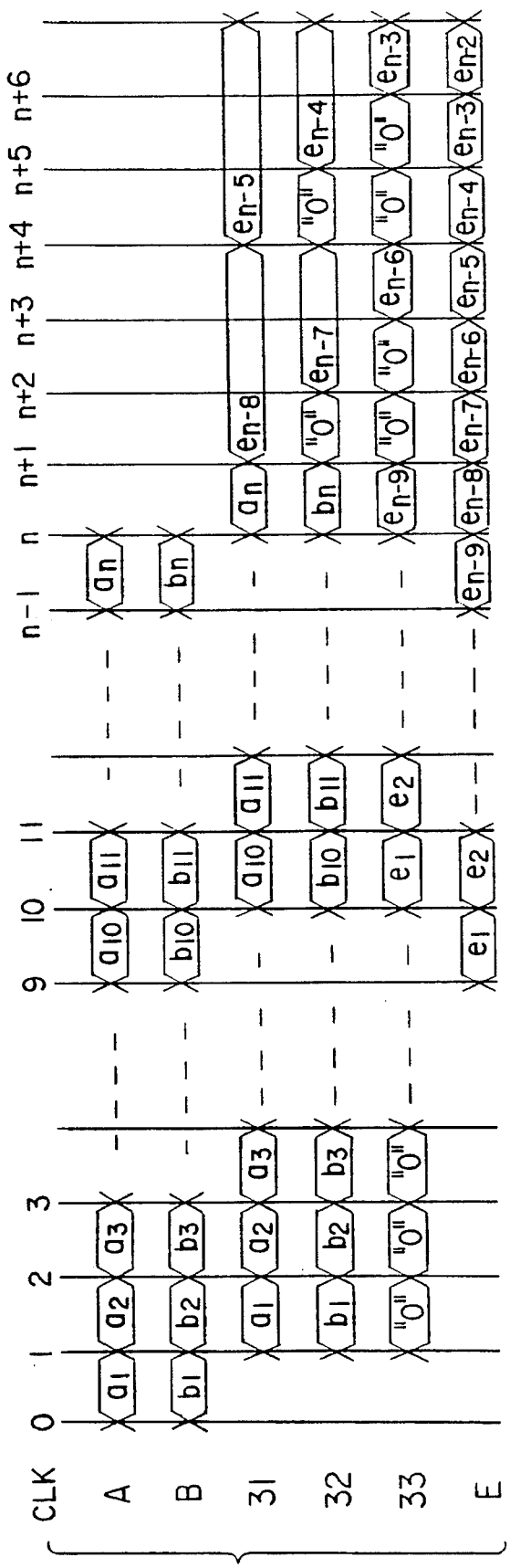
FIGS. 6(A), and 6(B) show, when

Referring to FIGS. 6(A) and 6(B) in addition to FIG. 5, the description will be made as regards operation of the vector calculation apparatus. The clock cycle is illustrated along a first or top row labelled CLK. The first-set components are depicted along a second row labelled A. The second-set components are illustrated along a third row labelled B. The first memorized signal is shown along a fourth row labelled 31. The second memorized signal is depicted along a fifth row labelled 32. The zeroth memorized signal is illustrated along a sixth row labelled 33. The adder output signal is shown along a seventh or bottom row labelled E.

As will presently be described in detail, the operation of the vector calculation apparatus is controlled in accordance with each of successive timing cycles which comprise zeroth, first through ninth, tenth through seventeenth, eighteenth through twenty-sixth, twenty-seventh through n-th, (n+1)-th, (n+2)-th, (n+3)-th through (n+8)-th, (n+9)-nh through (n+11)-th, (n+12)-th through (n+14)-th, (n+15)-th through (n+17)-th, and (n+18 )-th through (n+26)-th cycle times 0, 1 to 9, 10 to 17, 18 to 26, 27 to 35, 36 to (n−1), n, (n+1), (n+2), (n+3) to (n+8), (n+9) to (n+11), (n+12) to (n+14), (n+15) to (n+17), and (n+18) to (n+26).

Figure 6:
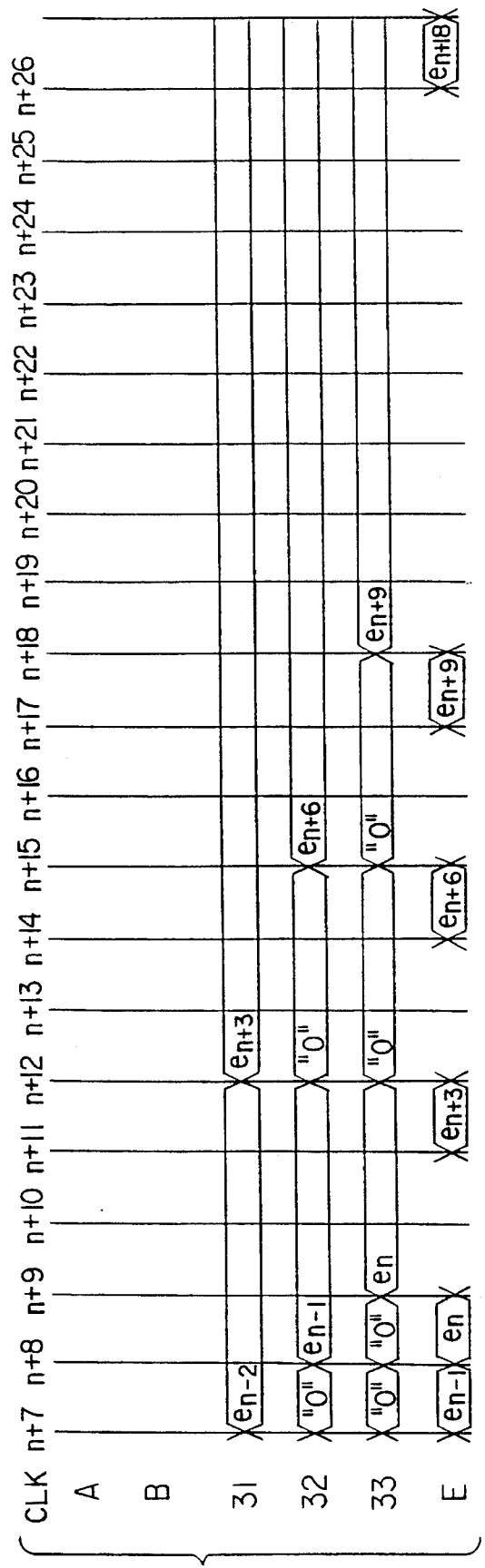

During the zeroth through the (n−1)-th cycle times 0 to n−1, the first selecting circuit 26 selects the first-set components $(a_1, a_2, \ldots, a_n)$ as the first selected signal, one component in each of the timing cycles. The second selecting circuit 27 selects the second-set components $(b_1, b_2, \ldots, b_n)$ as the second selected signal. The control circuit 29 makes the zeroth selecting circuit 24 select the predetermined value as the zeroth selected signal although illustration is not made in FIG. 6. Accordingly, the control circuit 29 will be herein referred to as a first select-making arrangement.

The first-set components $(a_1, a_2, \ldots, a_n)$ and the second-set components $(b_1, b_2, \ldots, b_n)$ are memorized as the first and the second memorized signals in the first and the second registers 31 and 32, respectively, during the first through the n-th cycle times 1 to n. The predetermined value is memorized as the zeroth memorized signal in the third register 33 at the first through the ninth cycle times 1 to 9. The first, the second, and the zeroth memorized signals are supplied as the first, the second, and the third adder input signals to the vector adder 21.

The vector adder 21 carries out addition of the first, the second, and the third adder input signals at each of the first through the ninth cycle times 1 to 9 and produces first through ninth output components $(e_1, e_2, \ldots, e_g)$ as the adder output signal at the ninth through the seventeenth cycle times 9 to 17.

During the tenth through the eighteenth cycle times 10 to 18, the zeroth selecting circuit 24 selects the adder output signal, namely, the first through the ninth output components ($e_1, e_2, \ldots, e_9$), one component in each of the timing cycles.

The first through the ninth output components ($e_1, e_2, \ldots, e_9$) are memorized as the zeroth memorized signal in the third register 33. The first, the second, and the zeroth memorized signals are supplied as the first, the second, and the third adder input signals to the vector adder 21.

The vector adder 21 carries out the addition of the first, the second, and the third adder input signals at each of the tenth through the eighteenth cycle times 10 to 18 and produces tenth through eighteenth output components ($e_{10}, e_{11}, \ldots, e_{18}$) as the adder output signal at the eighteenth through the twenty-sixth cycle time 18 to 26. The tenth through the eighteenth output components ($e_{10}, e_{11}, \ldots, e_{18}$) are memorized as the zeroth memorized signal in the third register 33.

In this manner, nineteenth through n-th output components ($e_{19}, e_{20}, \ldots, e_n$) are produced in the vector adder 21 at the twenty-seventh through the (n+8)-th cycle times 27 to n+8 and are memorized in the third register 33.

Thus, the vector adder 21 repeatedly carries out the addition to produce the first through the n-th output components ($e_1, e_2, \ldots, e_n$) at the ninth through the (n+8)-th cycle times 9 to n+8. In this event, the control circuit 29 makes the zeroth selecting circuit 24 select the adder output signal as the selected signal to store the first through the n-th output components ($e_1, e_2, \ldots, e_n$) in the third register 33. Accordingly, the control circuit 29 will be referred to herein as a second select-making arrangement.

At the (n+1)-th cycle time n+1, the first selecting circuit 26 selects (n–8)-th output component $e_{n-8}$ to store the (n–8)-th output component $e_{n-8}$ in the first register 31. The second Selecting circuit 27 selects the predetermined value to store the predetermined value in the second register 32. The zeroth selecting circuit 24 selects the predetermined value to store the predetermined value in the third register 33.

At the (n+2)-th cycle dime n+2, the control circuit 29 controls the first register 31 to make the first register 31 hold the (n–8)-th output component $e_{n-8}$. The second selecting circuit 27 selects (n–7)-th output component $e_{n-7}$ to store the (n–7)-th output component $e_{n-7}$ in the second register 32. The zeroth selecting circuit 24 selects the predetermined value to store the predetermined value in the third register 33.

At the (n+3)-th cycle time n+3, the control circuit 29 controls the first and the second registers 31 and 32 to hold the (n–8)-th and the (n–7)-th output components $e_{n-8}$ and $e_{n-7}$ in the first and the second registers 31 and 32. The zeroth selecting circuit 24 selects (n–6)-th output component $e_{n-6}$ to store the (n–6)-th output component $e_{n-6}$ in the third register 33. The (n–8)-th, the (n–7)-th, and the (n–6)-th output components $e_{n-8}$, $e_{n-7}$, and $e_{n-6}$ are supplied to the vector adder 21 and summed up in the vector adder 21 to produce (n+3)-th output components $e_{n+3}$ at the (n+11)-th cycle time n+11 under control of the control circuit 29.

In this manner, (n+6)-th and (n+9)-th output components $e_{n+6}$ and $e_{n+9}$ are produced from the vector adder 21 at the (n+14)-th and (n+17)-th cycle times n+14 and n+17 under control of the control circuit 29. In this event, the control circuit 29 makes the first, the second and the zeroth selecting circuits 26, 27, and 24 select the adder output signal as each of the first, the second, and the zeroth selected signals in predetermined order. Accordingly, the control circuit 29 will be referred to herein as a third select-making arrangement.

At the (n+12)-th cycle time n+12, the first selecting circuit 26 selects the (n+3)-th output component $e_{n+3}$ to store the (n+3)-th output component $e_{n+3}$ in the first register 31. The second selecting circuit 27 selects the predetermined value to store the predetermined value in the second register 32. The zeroth selecting circuit 24 selects the predetermined value to store the predetermined value in the third register 33.

During the (n+12)-th through the (n+26)-th cycle times n+12 to n+26, the control circuit 29 controls the first register 31 to make the first register 31 hold the (n+3)-th output component $e_{n+3}$. During the (n+12)-th through the (n+14)-th cycle times n+12 to n+14, the control circuit 29 controls the second and the third registers 32 and 33 to make the second and the third registers 32 and 33 hold the predetermined value.

At the (n+15)-th cycle time n+15, the second selecting circuit 27 selects the (n+6)-th output component $e_{n+6}$ to store the (n+6)-th output component $e_{n+6}$ in the second register 32. The zeroth selecting circuit 24 selects again the predetermined value to store the predetermined value in the third register 33. During the (n+15)-th through the (n+26)-th cycle times n+15 to n+26, the control circuit 29 controls the second register 32 to make the second register 32 hold the (n+6)-th output component $e_{n+6}$.

At the (n+18)-th cycle time n+15, the zeroth selecting circuit 24 selects the (n+9)-th output component $e_{n+9}$ to store the (n+9)-th output component $e_{n+9}$ in the third register 33. During the (n+18)-th through the (n+26)-th cycle times n+18 to n+26, the control circuit 29 controls the third register 33 to make the third register 33 hold the (n+9)-th output component $e_{n+9}$.

The (n+3)-th, the (n+6)-th, and the (n+9)-th output components $e_{n+3}$, $e_{n+6}$, and $e_{n+9}$ are supplied to the vector adder 21 and summed up in the vector adder 21 to produce (n+18)-th output components $e_{n+18}$ at the (n+26)-th cycle time n+26 under control of the control circuit 29.

Accordingly, the total calculation time TCT is given by:

$$TCT = (2^{k-1} + 26)T.$$

When it is assumed that k is equal to 8, the total calculation time TCT is as follows:

$$TCT = (2^{k-1} + 26)T = (2^7 + 26)T.$$

Namely, the vector calculation apparatus can carry out a vector calculation of two vectors at a high speed.

While the present invention has thus far been described in connection with only one preferred embodiment thereof, it will now be readily possible for those skilled in the art to put this invention into practice in various other manners. For example, the control circuit 29 may be designed in such a manner that the vector adder 21 produces the adder output signal when less or more than eight cycle times lapse after the vector adder 21 is supplied with the first and the second adder input signals.

What is claimed is:

1. An apparatus for calculating a result of vector calculation in response to a first vector composed of a plurality of first-set components and a second vector composed of a plurality of second-set components, said apparatus including a vector adder for carrying out addition of a first, a second, and a third adder input signal to produce an adder output signal as said result and zeroth selecting means connected to said vector adder for selecting, as a zeroth selected signal, one of said adder output signal and a predetermined value, said apparatus comprising:

first selecting means connected to said vector adder for selecting, as a first selected signal, a selected one of said first-set components and said adder output signal;

second selecting means connected to said vector adder for selecting, as a second selected signal, a selected one of said second-set components, said predetermined value and said adder output signal;

supplying means connected to said first, said second, and said zeroth selecting means for carrying out a supply operation to supply said vector adder in accordance with said supply operation with said first selected signal as said first adder input signal, with said second selected signal as said second adder input signal, and with said zeroth selected signal as said third adder input signal; and control means connected to said vector adder, said first, said second, and said zeroth selecting means, and said supplying means for controlling said vector adder, said first, said second, and said zeroth selecting means, and said supply means, said supplying means carrying out said supply operation in accordance with a mode determined by said control means, wherein said supplying means includes, a first register connected to said vector adder, said first selecting means, and said control means for storing said first selected signal as a first stored signal, and to supply said first stored signal as said first adder input signal to said vector adder under control of said control means, a second register connected to said vector adder, said second selecting means, and said control means for storing said second selected signal as a second stored signal, and to supply said second stored signal as said second adder input signal to said vector adder under control of said control means, and a third register connected to said vector adder, said zeroth selecting means, and said control means for storing said zeroth selected signal as a zeroth stored signal to supply said zeroth stored signal as said third adder input signal, and to said vector adder under control of said control means, wherein said vector adder has a calculation time for carrying out said addition of said first, said second, and said third adder input signals, wherein said predetermined value equals zero, and wherein said control means includes first supply-making means connected to said first, said second, and said zeroth selecting means for making said first selecting means supply, as said first selected signal, said selected one of said first-set components to said first register, for making said second selecting means supply, as said second selected signal, said selected one of said second-set components to said second register, and for making said zeroth selecting means supply said predetermined value as said zeroth selected signal to said third register, second supply-making means connected to said first, said second, and said zeroth selecting means for making said first selecting means supply, as said first selected signal, said selected one of said first-set components to said first register, for making said second selecting means supply, as said second selected signal, said selected one of said second-set components to said second register, and for making said zeroth selecting means supply said adder output signal as said zeroth selected signal to said third register, third supply-making means connected to said first, said second, and said zeroth selecting means for making said first selecting means supply said adder output signal as said first selected signal to said first register, for making said second selecting means supply said predetermined value as said second selected signal to said second register, and for making said third selecting means supply said predetermined value as said zeroth selected signal to said third register, and determining means connected to said first, said second, and said third supply-making means for determining an order of operation of said first, said second, and said third supply-making means so that said first supply-making means is operated during said calculation time, said second supply-making means is operated after lapse of said calculation time, and said third supply-making means is operated after said first and said second registers are respectively supplied with said first and said second selected signals.

2. An apparatus for calculating a result of vector calculation in response to a first vector composed of a plurality of first-set components and a second vector composed of a plurality of second-set components, said apparatus including a vector adder for carrying out addition of a first, a second, and a third adder input signal to produce an adder output signal as said result and zeroth selecting means connected to said vector adder for selecting, as a zeroth selected signal, one of said adder output signal and a predetermined value, said apparatus comprising:

first selecting means connected to said vector adder for selecting, as a first selected signal, a selected one of said first-set components, said predetermined value and said adder output signal;

second selecting means connected to said vector adder for selecting, as a second selected signal, a selected one of said second-set components and said adder output signal;

supplying means connected to said first, said second, and said zeroth selecting means for carrying out a supply operation to supply said vector adder in accordance with said supply operation with said first selected signal as said first adder input signal, with said second selected signal as said second adder input signal, and with said zeroth selected signal as said third adder input signal; and control means connected to said vector adder, said first, said second, and said zeroth selecting means, and said supplying means for controlling said vector adder, said first, said second, and said zeroth selecting means, and said supply means, said supplying means carrying out said supplying operation in accordance with a mode determined by said control means, wherein said supplying means includes, a first register connected to said vector adder, said first selecting means, and said control means for storing said first selected signal as a first stored signal, and to supply said first stored signal as said first adder input signal to said vector adder under control of said control means, a second register connected to said vector adder, said second selecting means, and said control means for storing said second selected signal as a second stored signal, and to supply said second stored signal as said second adder input signal to said vector adder under control of said control means, and a third register connected to said vector adder, said zeroth selecting means, and said control means for storing said zeroth selected signal as a zeroth stored signal, and to supply said zeroth stored signal as said third adder input signal to said vector adder under control of said control means, wherein said vector adder has a calculation time for carrying out said addition of said first, said second, and said third adder input signals, wherein said predetermined value equals zero, wherein said vector adder produces said adder output signal at each of successive timing cycles which include a selected cycle time, a particular cycle time succeeding said selected cycle time, and a specific cycle time succeeding said particular cycle time, and wherein said control means includes first supply-making means connected to said first, said second, and said zeroth selecting means for making said first selecting means supply, as said first selected signal, said selected one of said first-set components to said first register, for making said second selecting means supply, as said second selected signal, said selected one of said second-set components to said second register, and for making said zeroth selecting means supply said predetermined value as said zeroth selected signal to said third register, second supply-making means connected to said first, said second, and said zeroth selecting means for making said first selecting means supply, as said first selected signal, said selected one of said first-set components to said first register, for making said second selecting means supply, as said second selected signal, said selected one of said second-set components to said second register, and for making said zeroth selecting means supply said adder output signal as said zeroth selected signal to said third register, third supply-making means connected to said first, said second, and said zeroth selecting means for making said first selecting means supply said adder output signal as said first selected signal to said first register, for making said second selecting means supply said predetermined value as said second selected signal to said second register, and for making said third selecting means supply said predetermined value as said zeroth selected signal to said third register, fourth supply-making means connected to said first, said second, and said zeroth selecting means for making said first selecting means not supply said first selected signal to said first register, for making said second selecting means supply said adder output signal as said second selected signal to said second register, and for making said zeroth selecting means supply said predetermined value as said zeroth selected signal to said third register, fifth supply-making means connected to said first, said second, and said zeroth selecting means for making said first selecting means not supply said first selected signal to said first register, for making said second selecting means not supply said second selected signal to said second register, and for making said zeroth selecting means supply said adder output signal as said zeroth selected signal to said third register, and determining means connected to said first, said second, said third, said fourth, and said fifth supply-making means for determining an order of operation of said first, said second, said third, said fourth, and said fifth supply-making means so that said first supply-making means is operated during said calculation time, said second supply-making means is operated after lapse of said calculation time, said third supply-making means is operated at said selected cycle time after said first and said second registers are respectively supplied with said first and said second selected signals, said fourth supply-making means is operated at said particular cycle time, and said fifth supply-making means is operated at said specific cycle time.

* * * * *

UNITED STATES PATENT AND TRADEMARK OFFICE
CERTIFICATE OF CORRECTION

PATENT NO. : 5,493,521
DATED : February 20, 1996
INVENTOR(S) : Shingo OOTA et al.

It is certified that error appears in the above-indentified patent and that said Letters Patent is hereby corrected as shown below:

Title page, item [30] Foreign Application Priority Data, delete "Nov. 11, 1990" and insert --November 8, 1990--.

Signed and Sealed this

Seventeenth Day of December, 1996

Attest:

BRUCE LEHMAN

*Attesting Officer*  *Commissioner of Patents and Trademarks*